(No Model.)

N. DU BRUL.
CIGAR COLORING AND FLAVORING MACHINE.

No. 274,472.        Patented Mar. 27, 1883.

Attest_
Carl Spengel_
Herbert Knight

Inventor_
Napoleon DuBrul_
by Knight Bros.
Atty's_

UNITED STATES PATENT OFFICE.

NAPOLEON DU BRUL, OF CINCINNATI, OHIO.

CIGAR COLORING AND FLAVORING MACHINE.

SPECIFICATION forming part of Letters Patent No. 274,472, dated March 27, 1883.

Application filed July 18, 1882. (No model.)

*To all whom it may concern:*

Be it known that I, NAPOLEON DU BRUL, of Cincinnati, Hamilton county, Ohio, have invented a new and useful Improvement in Machines for Coloring and Flavoring Cigars, of which the following is a specification.

This invention relates to a means of expeditious and effective coloration of cigars either with or without flavoring of the same, or of simply washing and tightening the external portions or wrappers upon the fillings, so as to present a smooth and merchantable appearance, the leaf after each such moistening having a tendency to contract.

Figure 1:
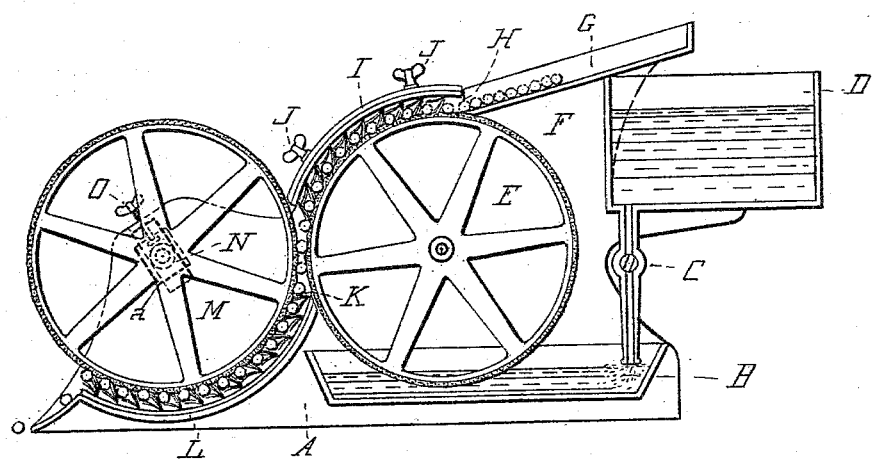
Figure 2:
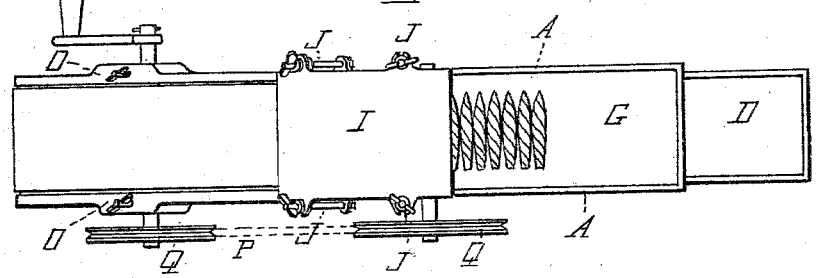

In the accompanying drawings a cigar-coloring machine embodying my invention is represented, in Figure 1, by vertical section in the plane of rotation of the coloring and wiping cylinders, and in Fig. 2 by a top view.

A represents one of two similar plates, which are held in a parallel vertical position a little greater distance apart than the length of a cigar by the interposed operative parts or otherwise.

Fixed in the lower part of the machine is a tank or pan, B, which is fed with the coloring or coloring and flavoring liquid, in any desired quantity, at discretion of the operator, by cock C from elevated reservoir D.

So journaled in the machine as for a portion of its rim to revolve within the liquid contents of the tank B is a wheel, drum, or cylinder, E, whose periphery is clothed with felt, F, or other suitable bibulous and elastic material.

A sloping chute, G, upon which the cigars to be operated upon are fed, conducts them into an annular space, H, formed between said cylinder and a concave brush, I, whose attachment to the frame is adjustable toward and from the cylinder by means of screws J. From annular space H the cigars, after treatment with coloring material by their rolling contact with cylinder E and brush I, descend into a similar interstice, K, between concave brush L and similarly-felted cylinder M, contact with whose periphery operates to wipe off or remove all superabundant or surplus liquid, so as to deliver the cigars in a comparatively dry condition at the lower extremity of the said interstice. The wiping-cylinder M is journaled in a box, N, which occupies a slot, a, in the frame, having a radial position relatively to the opposing surfaces of said cylinder and its concave, and each box has an adjustable screw, O, by which the person in charge can shift the cylinder toward or from its concave. The cylinders E and M are caused to so revolve as to give their adjacent peripheries a like downward movement by means of any suitable connection—such, for example, as a band, P, and scored pulleys Q.

I claim as new and of my invention—

1. In combination with the felted drum or cylinder E F and concave brush I, the supplementary wiping drum or cylinder M and concave wiping-brush L, substantially as and for the purpose set forth.

2. In a machine to color cigars, the combination of saturating-drum E F, concave saturating-brush I, reservoir D, cock C, tank B, wiping-brush L, and cylinder M, substantially as and for the purpose described.

3. In a machine to color or flavor cigars, a saturating-drum or revolving member, E, and means for saturating said drum or member, in combination with a supplementary revolving drum, M, which immediately receives the cigars and wipes off the surplus of coloring, substantially as and for the purpose set forth.

In testimony of which invention I hereunto set my hand.

NAPOLEON DU BRUL.

Attest:
GEORGE H. KNIGHT,
SAML. S. CARPENTER.